(12) United States Patent
Uematsu

(10) Patent No.: US 9,883,062 B2
(45) Date of Patent: Jan. 30, 2018

(54) IMAGE READER AND IMAGE FORMING APPARATUS

(71) Applicant: FUJI XEROX CO., LTD., Tokyo (JP)

(72) Inventor: Mari Uematsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/215,724

(22) Filed: Jul. 21, 2016

(65) Prior Publication Data

US 2017/0264762 A1 Sep. 14, 2017

(30) Foreign Application Priority Data

Mar. 14, 2016 (JP) .................................. 2016-049763

(51) Int. Cl.
*H04N 1/04* (2006.01)
*H04N 1/00* (2006.01)

(52) U.S. Cl.
CPC ..... *H04N 1/00615* (2013.01); *H04N 1/00015* (2013.01); *H04N 1/00602* (2013.01); *H04N 1/00795* (2013.01); *H04N 2201/0081* (2013.01)

(58) Field of Classification Search
CPC .... H04N 1/193; H04N 1/1017; H04N 1/1013; H04N 1/1026; H04N 1/103; H04N 1/00615; H04N 1/00015; H04N 1/00602; H04N 2001/0081; Y04N 1/00795
USPC ....... 358/497, 494, 474, 471, 505, 482, 483; 250/234–236; 399/211
See application file for complete search history.

(56) References Cited

U.S. PATENT DOCUMENTS

| | | | | |
|---|---|---|---|---|
| 4,545,695 A * | 10/1985 | Agata | ........................ | B41J 3/28 400/31 |
| 4,982,236 A * | 1/1991 | Bock | ....................... | G03G 15/04 355/67 |
| 4,993,995 A * | 2/1991 | Okazaki | ............... | G03B 27/526 474/140 |
| 5,002,366 A * | 3/1991 | Okazaki | ................. | G03G 15/04 359/896 |
| 5,299,033 A * | 3/1994 | Watanabe | ............ | H04N 1/1026 254/266 |
| 5,592,308 A * | 1/1997 | Fujiwara | .............. | H04N 1/1013 250/234 |
| 6,525,503 B2 * | 2/2003 | Fang | .................... | H04N 1/1013 318/15 |
| 6,756,749 B2 * | 6/2004 | Haas | ...................... | G05B 19/40 318/139 |
| 7,072,082 B2 * | 7/2006 | Yokota | ................. | H04N 1/0464 250/208.1 |

(Continued)

FOREIGN PATENT DOCUMENTS

JP 2006-142734 A 6/2006

*Primary Examiner* — Cheukfan Lee
(74) *Attorney, Agent, or Firm* — Sughrue Mion, PLLC

(57) ABSTRACT

Provided is an image reader including a transparent plate that supports an original document on which an image is recorded, a reading member that is disposed inside a housing and reads an image of the original document supported by the transparent plate while moving, a guide member that extends in a movement direction of the reading member and guides the moving reading member, and an endless belt that is wound around a driving pulley that performs rotational driving and a driven pulley that is driven to rotate, the endless belt being rotated around the driving pulley and the driven pulley to move the reading member guided by the guide member, wherein at least one of the driving pulley and the driven pulley is attached to the guide member.

10 Claims, 7 Drawing Sheets

(56) References Cited

U.S. PATENT DOCUMENTS

| | | | | |
|---|---|---|---|---|
| 7,534,183 B2* | 5/2009 | Hung | G03G 15/602 475/5 |
| 7,936,486 B2* | 5/2011 | Shin | H04N 1/1017 271/186 |
| 7,944,591 B2* | 5/2011 | Bokelman | H04N 1/1013 101/352.08 |
| 8,508,815 B2* | 8/2013 | Kim, II | H04N 1/0402 318/685 |
| 2002/0003207 A1* | 1/2002 | Fang | H04N 1/0402 250/234 |
| 2003/0048489 A1* | 3/2003 | Lin | H04N 1/04 358/474 |
| 2006/0203300 A1* | 9/2006 | Choi | H04N 1/1017 358/474 |
| 2006/0240924 A1* | 10/2006 | Osakabe | B41J 19/005 474/117 |
| 2007/0126787 A1* | 6/2007 | Naruse | B41J 19/20 347/37 |
| 2007/0146817 A1* | 6/2007 | Osakabe | H04N 1/1017 358/474 |
| 2011/0273749 A1* | 11/2011 | Wang | H04N 1/1017 358/474 |
| 2011/0299133 A1* | 12/2011 | Wang | H04N 1/1017 358/474 |
| 2013/0148147 A1* | 6/2013 | Wang | G03G 15/1615 358/1.13 |
| 2014/0240802 A1* | 8/2014 | Otomo | H04N 1/1017 358/497 |
| 2015/0229800 A1* | 8/2015 | Imoto | H04N 1/026 74/89.22 |

* cited by examiner

IMAGE READER AND IMAGE FORMING APPARATUS

CROSS-REFERENCE TO RELATED APPLICATIONS

This application is based on and claims priority under 35 USC 119 from Japanese Patent Application No. 2016-049763 filed Mar. 14, 2016.

BACKGROUND

Technical Field

The present invention relates to an image reader and an image forming apparatus.

SUMMARY

According to an aspect of the invention, there is provided an image reader including:

a transparent plate that supports an original document on which an image is recorded;

a reading member that is disposed inside a housing and reads an image of the original document supported by the transparent plate while moving;

a guide member that extends in a movement direction of the reading member and guides the moving reading member; and an endless belt that is wound around a driving pulley that performs rotational driving and a driven pulley that is driven to rotate, the endless belt being rotated around the driving pulley and the driven pulley to move the reading member guided by the guide member, wherein at least one of the driving pulley and the driven pulley is attached to the guide member.

BRIEF DESCRIPTION OF THE DRAWINGS

Exemplary embodiments of the present invention will be described in detail based on the following figures, wherein.

DETAILED DESCRIPTION (First Exemplary Embodiment)

Examples of an image reader and an image forming apparatus according to first exemplary embodiment will be described with reference to FIGS. 1 to 6. Meanwhile, an arrow H illustrated in the figures indicates the up-and-down direction (vertical direction) of the apparatus, an arrow W indicates the width direction of the apparatus (horizontal direction), and an arrow D indicates the depth direction of the apparatus (horizontal direction).

Overall Configuration

Figure 6:
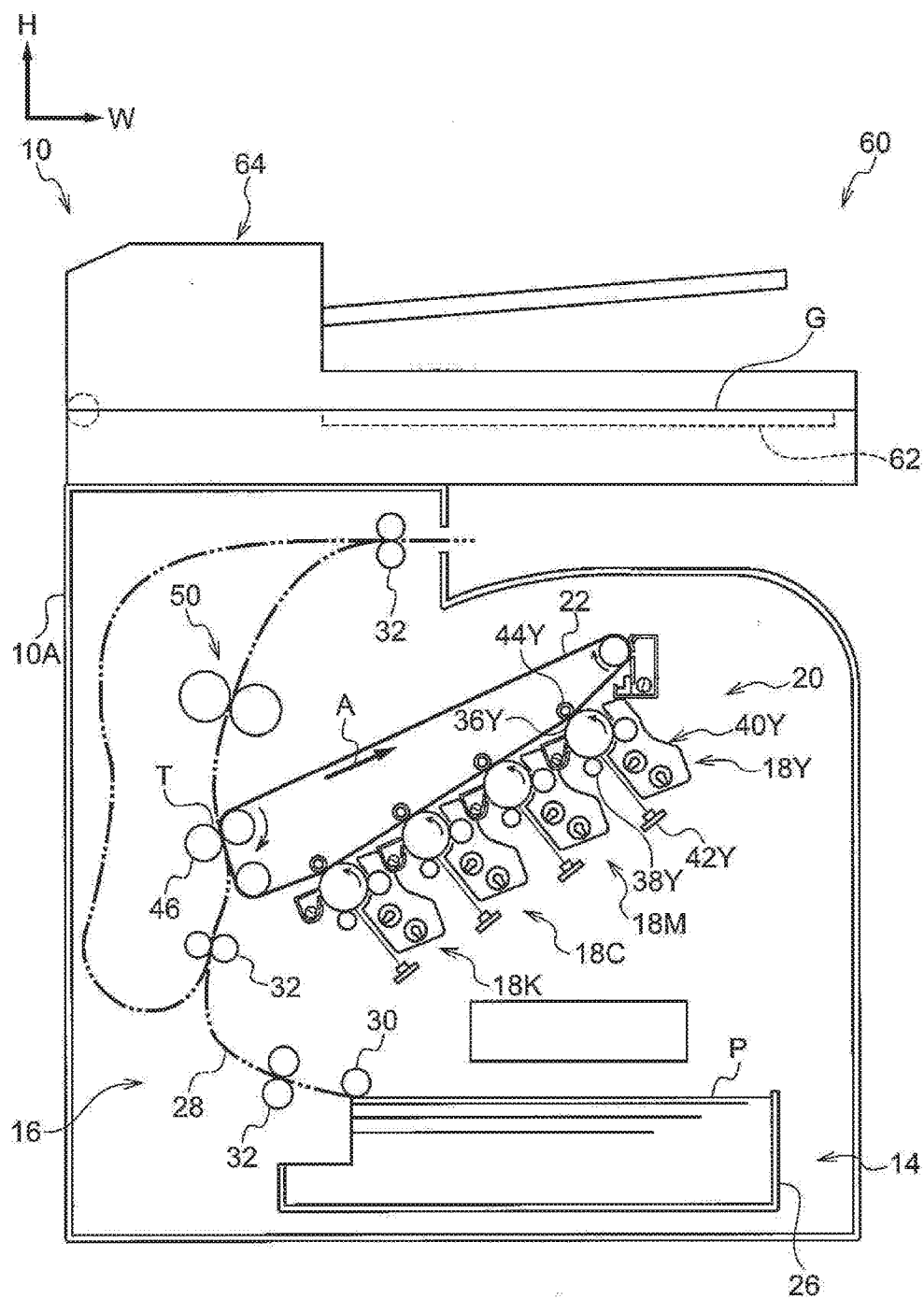
FIG. 6 is a schematic configuration diagram illustrating an image forming apparatus according to the first exemplary embodiment.

As illustrated in FIG. 6, an image forming apparatus 10 according to the present exemplary embodiment is provided with an accommodating unit 14 that accommodates a sheet member P as a recording medium accommodated therein, a transport unit 16 that transports the sheet member P accommodated in the accommodating unit 14, an image forming unit 20 that forms an image on the sheet member P transported by the transport unit 16 from the accommodating unit 14, and an image reading unit 60 as an example of the image reader that reads an image formed on an original document G, in this order, to the upper side from the lower side in the up-and-down direction (direction of the arrow H).

Accommodating Unit

The accommodating unit 14 is provided with an accommodating member 26 that is capable of being extracted from a housing 10A of the image forming apparatus 10 to the front side in the depth direction of the apparatus, and the sheet member P is loaded into the accommodating member 26. Further, the accommodating unit 14 is provided with a delivery roll 30 that delivers the sheet member P loaded into the accommodating member 26 to a transport path 28 configuring the transport unit 16.

Transport Unit

The transport unit 16 is provided with plural transport rolls 32 that transport the sheet member P along the transport path 28.

Image Forming Unit

The image forming unit 20 is provided with four image forming units 18Y, 18M, 18C, and 18K of yellow (Y), magenta (M), cyan (C), and black (K). Meanwhile, in the following description, in a case where Y, M, C, and K are not required to be described by distinguished from each other, Y, M, C, and K may be omitted.

Each image forming unit 18 of each color is attachable/detachable to/from the housing 10A. The image forming unit 18 of each color is provided with an image holder 36, a charging roll 38 that charges the surface of the image holder 36, and an exposure device 42 that irradiates the charged image holder 36 with exposure light. Further, the image forming unit 18 of each color is provided with a developing device 40 that develops an electrostatic latent image formed by the aforementioned exposure device 42 exposing the charged image holder 36 to visualize the developed image as a toner image.

In addition, the image forming unit 20 is provided with an endless transfer belt 22 that circles around in the direction of arrow A in the figure, and a primary transfer roll 44 that transfers the toner image formed by the image forming unit 18 of each color to the transfer belt 22. Further, the image forming unit 20 is provided with a secondary transfer roll 46 that transfers the toner image, transferred to the transfer belt 22, to the sheet member P, and a fixing device 50 that fixes the toner image onto the sheet member P by heating and pressing the sheet member P to which the toner image is transferred.

Image Reading Unit

The image reading unit 60 is provided with a reading unit 80 (see FIG. 4) as an example of a reading member that reads an image of the original document G. Meanwhile, the details of the image reading unit 60 will be described later.

Operation of Image Forming Apparatus

In the image forming apparatus 10, an image is formed as follows.

First, the charging roll 38 of each color to which a voltage is applied uniformly negatively charges the surface of the image holder 36 of each color with a prescribed potential. Subsequently, the exposure device 42 irradiates the charged surface of the image holder 36 of each color with exposure light to form an electrostatic latent image, based on data which is read by the image reading unit 60.

Thereby, the electrostatic latent image corresponding to the data is formed on the surface of the image holder 36 of each color. Further, the developing device 40 of each color develops this electrostatic latent image, and visualizes the developed image as a toner image. In addition, the toner image formed on the surface of the image holder 36 of each color is transferred to the transfer belt 22 by the primary transfer roll 44.

Consequently, the sheet member P delivered from the accommodating member 26 to the transport path 28 by the delivery roll 30 is delivered to a transfer position T at which the transfer belt 22 and the secondary transfer roll 46 come into contact with each other. At the transfer position T, the sheet member P is transported between the transfer belt 22 and the secondary transfer roll 46, and thus the toner image on the surface of the transfer belt 22 is transferred to the sheet member P.

The toner image transferred to the sheet member P is fixed onto the sheet member P by the fixing device 50. The sheet member P onto which the toner image is fixed exits to the outside of the housing 10A by the transport roll 32.

Main Component

Next, the image reading unit 60 will be described.

Figure 4:
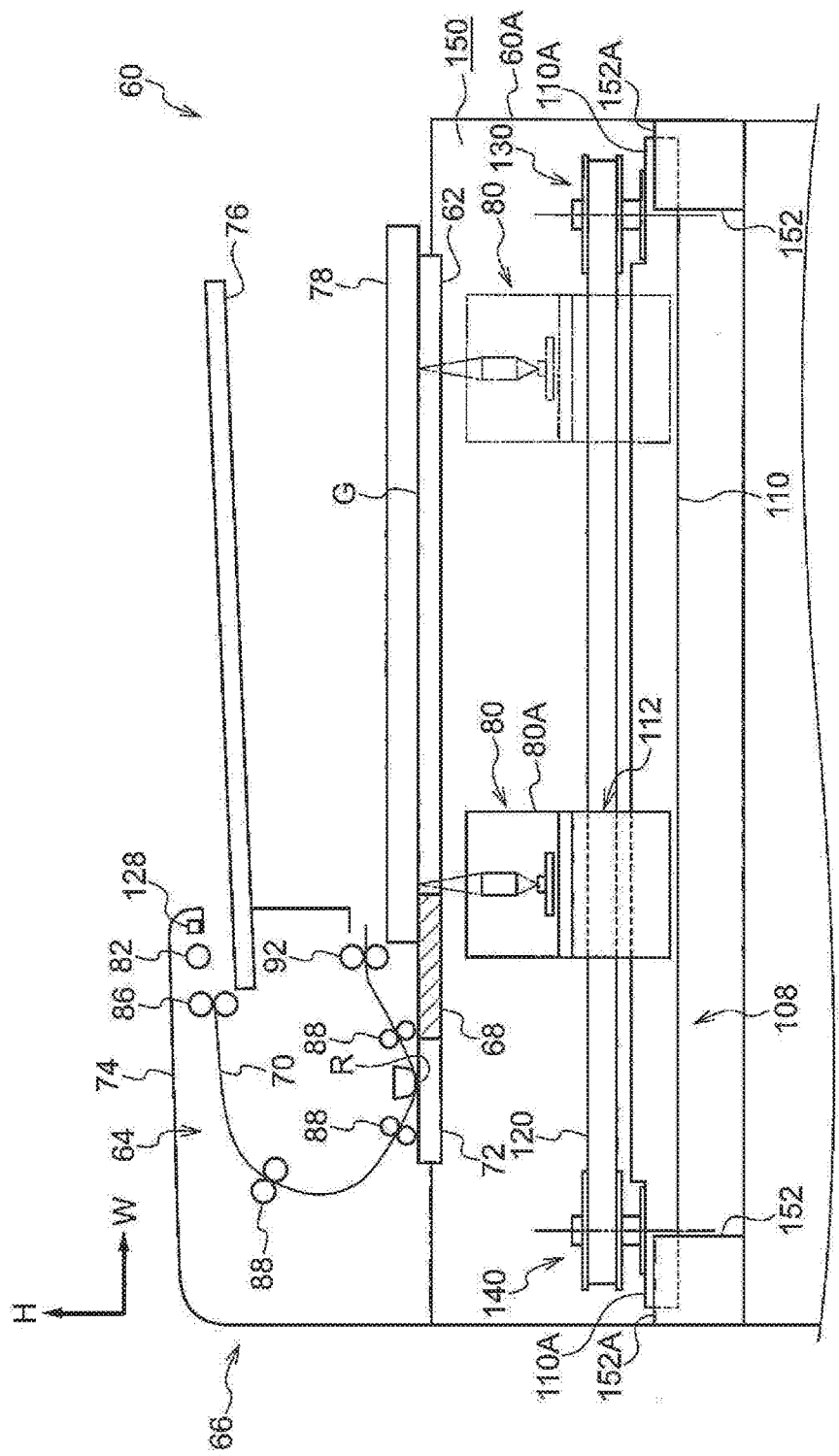
FIG. 4 is a diagram illustrating a configuration of the image reader according to the first exemplary embodiment.

As illustrated in FIG. 4, the image reading unit 60 includes a first transparent plate 62 (so-called platen glass) as an example of a transparent plate on which the original document G is placed (on which the original document G is supported) when an image of one original document G is read, and a second transparent plate 72 which is disposed on one side (left side in the figure) of the first transparent plate 62 in the width direction of the apparatus. The first transparent plate 62 and the second transparent plate 72 are fitted to the upper portion of a housing 60A of the image reading unit 60.

An opening/closing cover 66 that opens or closes the first transparent plate 62 and the second transparent plate 72 is disposed above the first transparent plate 62 and the second transparent plate 72. The opening/closing cover 66 has a transport device 64 (so-called, ADF device) provided therein, which transports plural original documents G along a transport path 70 within the opening/closing cover 66, and allows passage of an original document reading position R located above the second transparent plate 72.

In addition, a space 150 located inside the housing 60A is provided with the reading unit 80 as an example of a reading member that reads an image of the original document G placed on the first transparent plate 62 and an image of the original document G transported to the original document reading position R by the transport device 64. Further, the image reading unit 60 includes a driving device 108 that drives the reading unit 80 in the width direction of the apparatus.

First Transparent Plate and Second Transparent Plate

The plate surface of the first transparent plate 62 and the plate surface of the second transparent plate 72 face the up-and-down direction. The first transparent plate 62 is formed in a rectangular shape extending the width direction of the apparatus when viewed from above, and the second transparent plate 72 is formed in a rectangular shape extending in the depth direction of the apparatus when viewed from above.

In addition, a coupling plate 68 made of resin is disposed between the first transparent plate 62 and the second transparent plate 72.

Opening/Closing Cover

The opening/closing cover 66 includes a body portion 74 which is disposed above the second transparent plate 72 in a state where the first transparent plate 62 and the second transparent plate 72 are closed, and in which the transport device 64 is disposed. Further, the opening/closing cover 66 includes an original document tray 76, protruding from the body portion 74 to the other side (right side in the figure) in the width direction of the apparatus in the closed state of the opening/closing cover 66, on which one or plural original documents G transported by the transport device 64 are placed. In addition, the opening/closing cover 66 includes an exit tray 78, disposed below the original document tray 76 in the closed state of the opening/closing cover 66, which causes the original document G transported by the transport device 64 to exit and presses the original document G placed on the first transparent plate 62.

Transport Device

The transport device 64 includes a sensor 128 that detects the original document G placed on the original document tray 76, and a delivery roll 82 that delivers the original document G placed on the original document tray 76 to the transport path 70. Further, the transport device 64 includes a separation roll 86 that transports the original documents G delivered by the delivery roll 82 one by one.

In addition, the transport device 64 includes plural transport rolls 88 that transport the original document G separated by the separation roll 86 so that the original document passes through the original document reading position R located above the second transparent plate 72, and an exit roll 92 that causes the original document G transported by the transport roll 88 to exit to the exit tray 78.

Reading Unit

Figure 2:
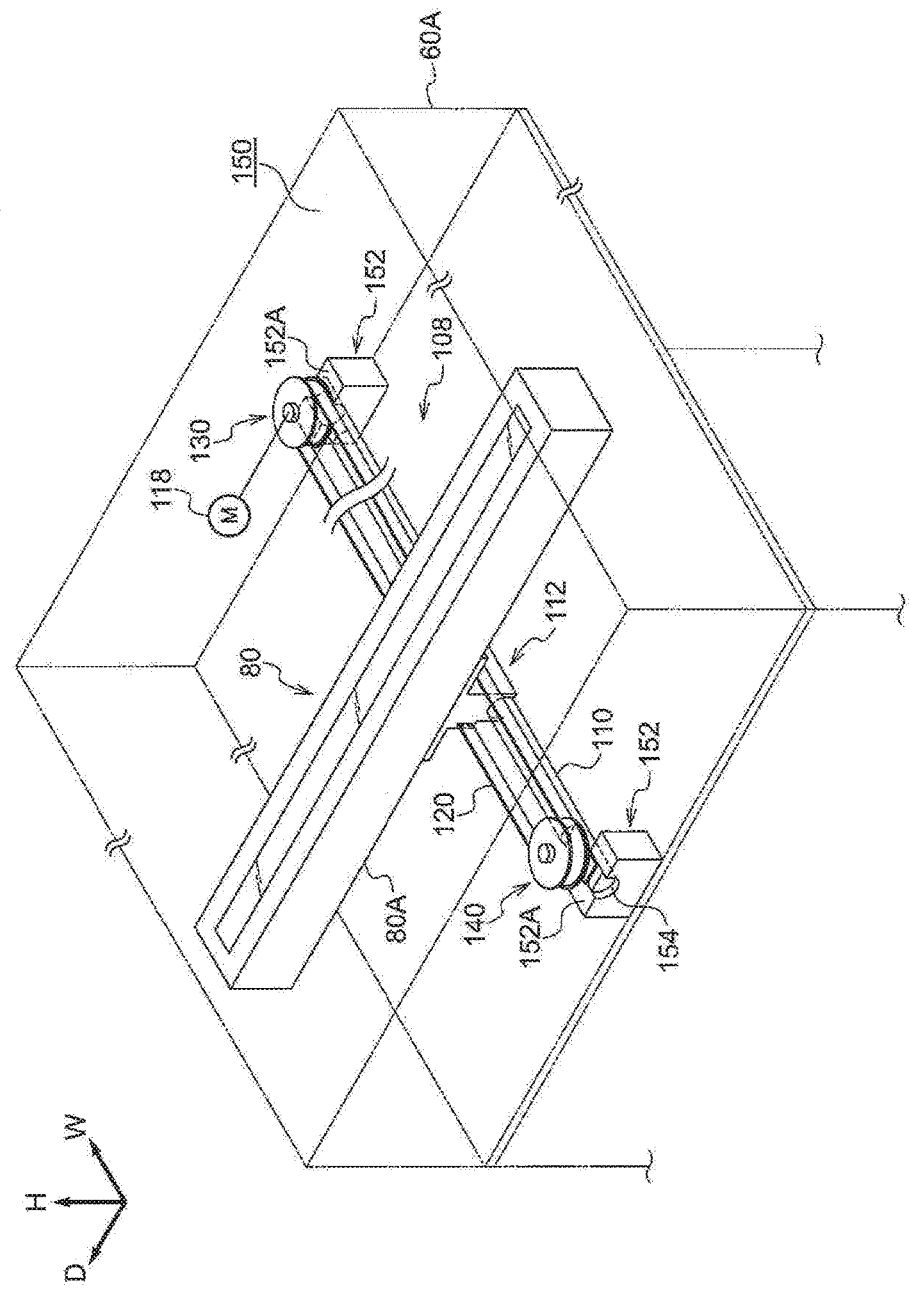
FIG. 2 is a perspective view illustrating the driving device and the like of the image reader according to the first exemplary embodiment.

The reading unit 80 is configured to read an image using a well-known CIS system having a lens array and the like disposed therein, and includes a rectangular parallelepiped housing 80A extending in the depth direction of the apparatus, as illustrated in FIG. 2.

Driving Device

Figure 1:
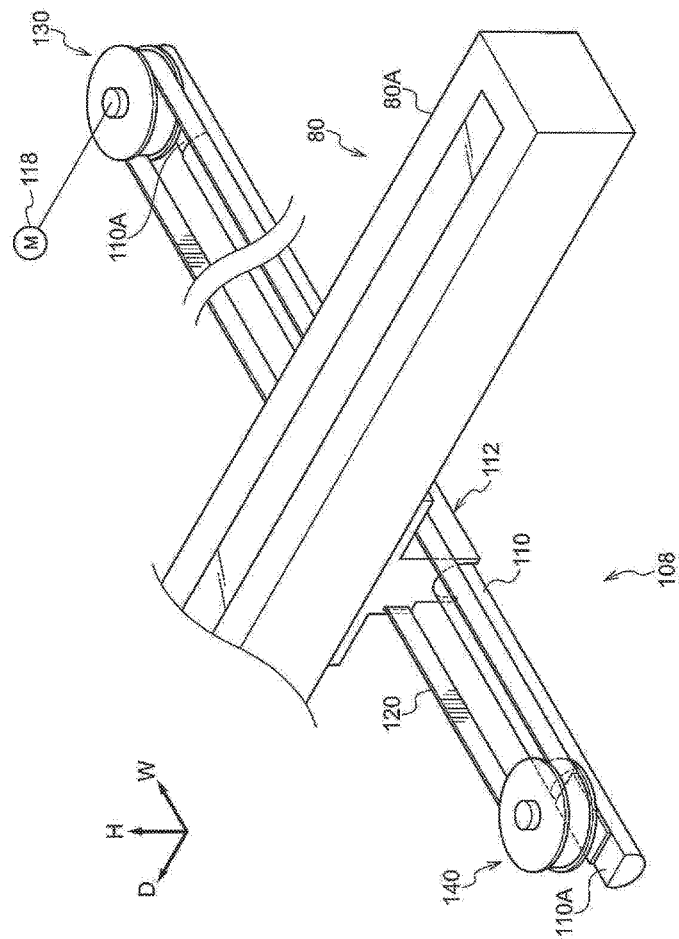
FIG. 1 is a perspective view illustrating a driving device and the like of an image reader according to a first exemplary embodiment.

As illustrated in FIG. 1, the driving device 108 includes a shaft 110 as an example of a guide member extending in the width direction of the apparatus (movement direction of the reading unit 80), and a sliding member 112 which is attached to the lower surface of the housing 80A and is slidably supported by the shaft 110.

Further, the driving device 108 includes a motor 118, a driving pulley 130 that rotates by a driving force being transferred from the motor 118, a driven pulley 140 that is rotated, and an endless belt 120 that are wound around the driving pulley 130 and the driven pulley 140.

Shaft

The shaft 110 has a cross-sectional circular shape made of metal, extends in the width direction of the apparatus, and is disposed below the housing 80A so as to intersect the central side of the housing 80A in the depth direction of the apparatus when viewed from above. Flat portions 110A facing upward are formed on both ends of the shaft 110 in a longitudinal direction, respectively.

In such a configuration, the shaft 110 is configured to guide the moving reading unit 80 in the width direction of the apparatus through the sliding member 112.

Sliding Member

Figure 3:
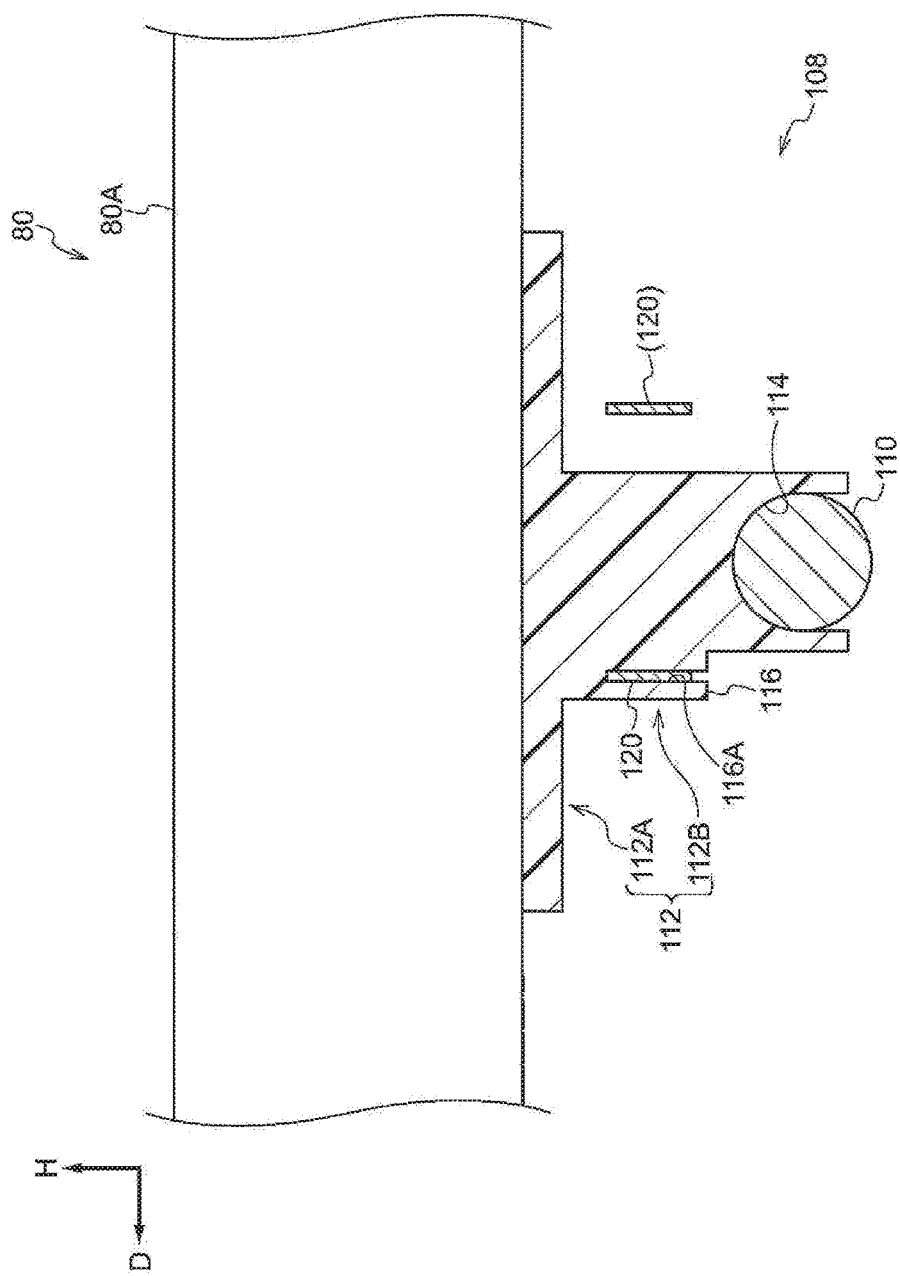
FIG. 3 is a cross-sectional view illustrating the driving device and the like of the image reader according to the first exemplary embodiment.

As illustrated in FIG. 2, the sliding member 112 is attached to the central side in the depth direction of the apparatus on the lower surface of the housing 80A. As illustrated in FIG. 3, the sliding member 112 includes a plate-shaped base 112A which is attached to the lower surface of the housing 80A, and a protruding portion 112B that protrudes downward further than the central side of the base 112A in the depth direction of the apparatus.

In addition, a step portion 116 is formed on the central side in the up-and-down direction in the protruding portion 112B, and a slit 116A extending in the up-and-down direction is formed on the step portion 116. A portion of the endless belt 120 described later is fitted onto the slit 116A. Further, a sliding surface 114, formed in a semicircular shape when viewed in the width direction of the apparatus, which slides relative to the shaft 110 is formed on the lower end side of the protruding portion 112B.

Driving Pulley and Driven Pulley

As illustrated in FIGS. 1 and 4, the driving pulley 130 is attached to the flat portion 110A formed on one end side (right side in the figure) of the shaft 110 so that its axial direction faces in the up-and-down direction. On the other hand, the driven pulley 140 is attached to the flat portion 110A formed on the other end side (left side in the figure) of the shaft 110 so that its axial direction faces in the up-and-down direction.

Endless Belt

The endless belt 120 is wound around the driving pulley 130 and the driven pulley 140 with a predetermined tensile force. As illustrated in FIG. 3, a portion of the endless belt 120 moving toward the back side in the depth direction of the apparatus is fitted and fixed to the slit 116A formed on the protruding portion 112B. In addition, a portion of the endless belt 120 moving toward the front side in the depth direction of the apparatus is separated from the protruding portion 112B.

Others

The housing 60A is formed to have a small thickness using PC-ABS which is an example of a resin material. As illustrated in FIG. 2, in the space 150 located inside the housing 60A, a pair of support portions 152 that support both ends of the shaft 110 from below are formed integrally with the housing 60A.

A top face 152A facing upward is formed on each of the support portions 152. Further, a contact portion 154, formed in a semicircular shape when viewed in the width direction of the apparatus, which comes into contact with the end side of the shaft 110 is formed on the top face 152A.

In such a configuration, the pair of support portions 152 are configured to support both ends of the shaft 110 from below. In this state, the reading unit 80 and the driving device 108 are configured to be disposed in the space 150.

Operation of Main Component

Next, the operation of the image reading unit 60 will be described. The image reading unit 60 is able to read an image of the original document G placed on the first transparent plate 62, and read an image of the original document G transported by the transport device 64. Meanwhile, in a state where a power supply of the image forming apparatus 10 is cut off, the reading unit 80 is disposed at a reading start position (position illustrated by the solid line of FIG. 4) where the image of the original document G placed on the first transparent plate 62 is started to be read.

First, reference will be made to FIG. 4 to describe a case where the reading unit 80 reads the image of the original document G placed on the first transparent plate 62.

In a case where a user presses an image reading start button (not illustrated), and the sensor 128 does not detect the original document G located on the original document tray 76, the image of the original document G placed on the first transparent plate 62 is started to be read. The reading unit 80 disposed at the reading start position moves in the width direction of the apparatus toward a reading termination position (dashed-two dotted line in the figure) along the first transparent plate 62 while reading the image of the original document G.

Specifically, the driving pulley 130 to which a rotational force is transferred from the motor 118 (see FIG. 2) rotates forward, and thus the endless belt 120 wound around the driving pulley 130 and the driven pulley 140 circles around in a forward direction between the driving pulley 130 and the driven pulley 140. When the endless belt 120 circles around in the forward direction, a moving force is transferred to the reading unit 80 through the sliding member 112. The sliding member 112 then slides relative to the shaft 110, and thus the reading unit 80 reads the image of the original document G while moving to one side (right side in the figure) in the width direction of the apparatus.

When the reading unit 80 reads the image of the original document G and reaches the reading termination position, the motor 118 (see FIG. 2) backward rotates the driving pulley 130. Thereby, the reading unit 80 moves to the reading start position and prepares for the next reading instruction.

Figure 5:
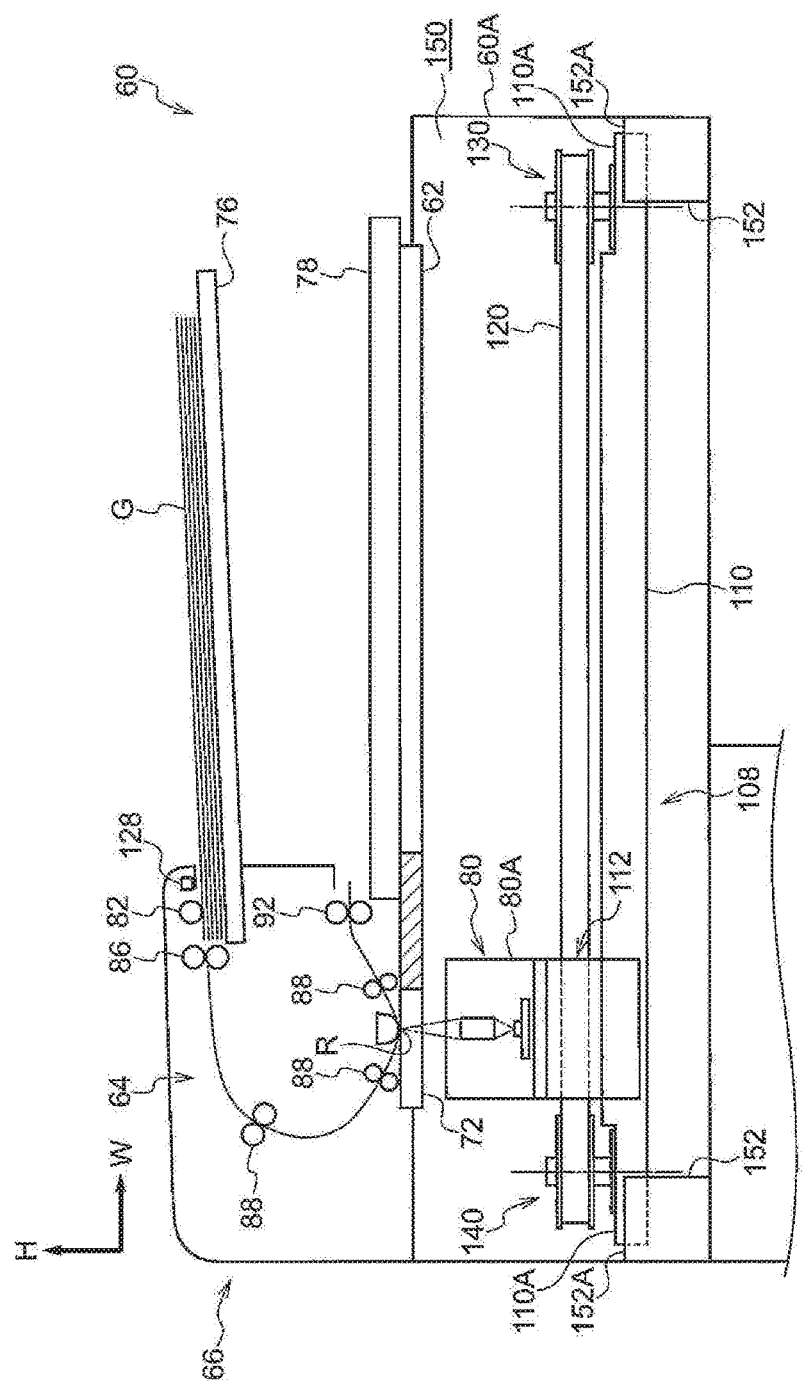
FIG. 5 is a diagram illustrating a configuration of the image reader according to the first exemplary embodiment.

Next, reference will be made to FIGS. 4 and 5 to describe a case where the reading unit 80 reads the image of the original document G transported by the transport device 64.

In a case where a user presses an image reading start button (not illustrated), and the sensor 128 detects original document G located on the original document tray 76, the reading unit 80 disposed at the reading start position moves to a transport reading position located below the second transparent plate 72. The image of the original document G transported by the transport device 64 is then started to be read.

Specifically, the driving pulley 130 to which a rotational force is transferred from the motor 118 (see FIG. 2) rotates backward, and thus the endless belt 120 wound around the driving pulley 130 and the driven pulley 140 circles around in a backward direction between the driving pulley 130 and the driven pulley 140. When the endless belt 120 circles around in the backward direction, a moving force is transferred to the reading unit 80 through the sliding member 112. The sliding member 112 then slides relative to the shaft 110, and thus the reading unit 80 moves toward the transport reading position (see FIG. 5) on the other side (left side in the figure) in the width direction of the apparatus. When the reading unit 80 reaches the transport reading position, a driving force transferred from the motor 118 to the driving pulley 130 is released, and the reading unit 80 stops at the transport reading position.

When the reading unit 80 stops at the transport reading position, the delivery roll 82 delivers the original document G placed on the original document tray 76 to the transport path 70. Further, the separation roll 86 separates the original documents G delivered to the transport path 70 one by one. The transport roll 88 then transports the original document G toward the original document reading position R, and the reading unit 80 reads the image of the original document G passing through the original document reading position R.

Further, the exit roll 92 causes the original document G having passed through the original document reading position R to exit to the exit tray 78.

When the reading of the image of the original document G by the reading unit 80 is terminated, the motor 118 (see FIG. 2) rotates the driving pulley 130 in the forward direction. Thereby, the reading unit 80 moves to the reading start position and prepares for the next reading instruction.

Conclusion of Main Component

As described above, the endless belt 120 circling around in order to move the reading unit 80 is wound around the driving pulley 130 and the driven pulley 140. Both the driving pulley 130 and the driven pulley 140 are attached to both ends of the metallic shaft 110 for guiding the reading unit 80. Therefore, it is possible to suppress a change in the gap between the driving pulley 130 and the driven pulley 140 which is caused due to a change in the ambient temperature (for example, 10 [° C.] to 28 [° C.]) around the apparatus, as compared with a case where both the driving pulley 130 and the driven pulley 140 are attached to the housing 60A made of resin.

In addition, since both the driving pulley 130 and the driven pulley 140 are attached to both ends of the metallic shaft 110, it is possible to suppress a change in the gap between the driving pulley 130 and the driven pulley 140 which is caused due to a change in the ambient temperature around the apparatus, as compared with a case where at least one of the driving pulley 130 and the driven pulley 140 is attached to the housing 60A made of resin.

In addition, a change in the gap between the driving pulley 130 and the driven pulley 140 is suppressed, and thus the endless belt 120 is prevented from stepping out (not maintaining a predetermined speed due to the endless belt 120 slipping with respect to the pulleys).

In addition, in the image forming apparatus 10, the endless belt 120 is prevented from stepping out, and thus the frequency of maintenance of the image reading unit 60 is reduced as compared with a case where the endless belt 120 is not prevented from stepping out.

(Second Exemplary Embodiment)

Figure 7:
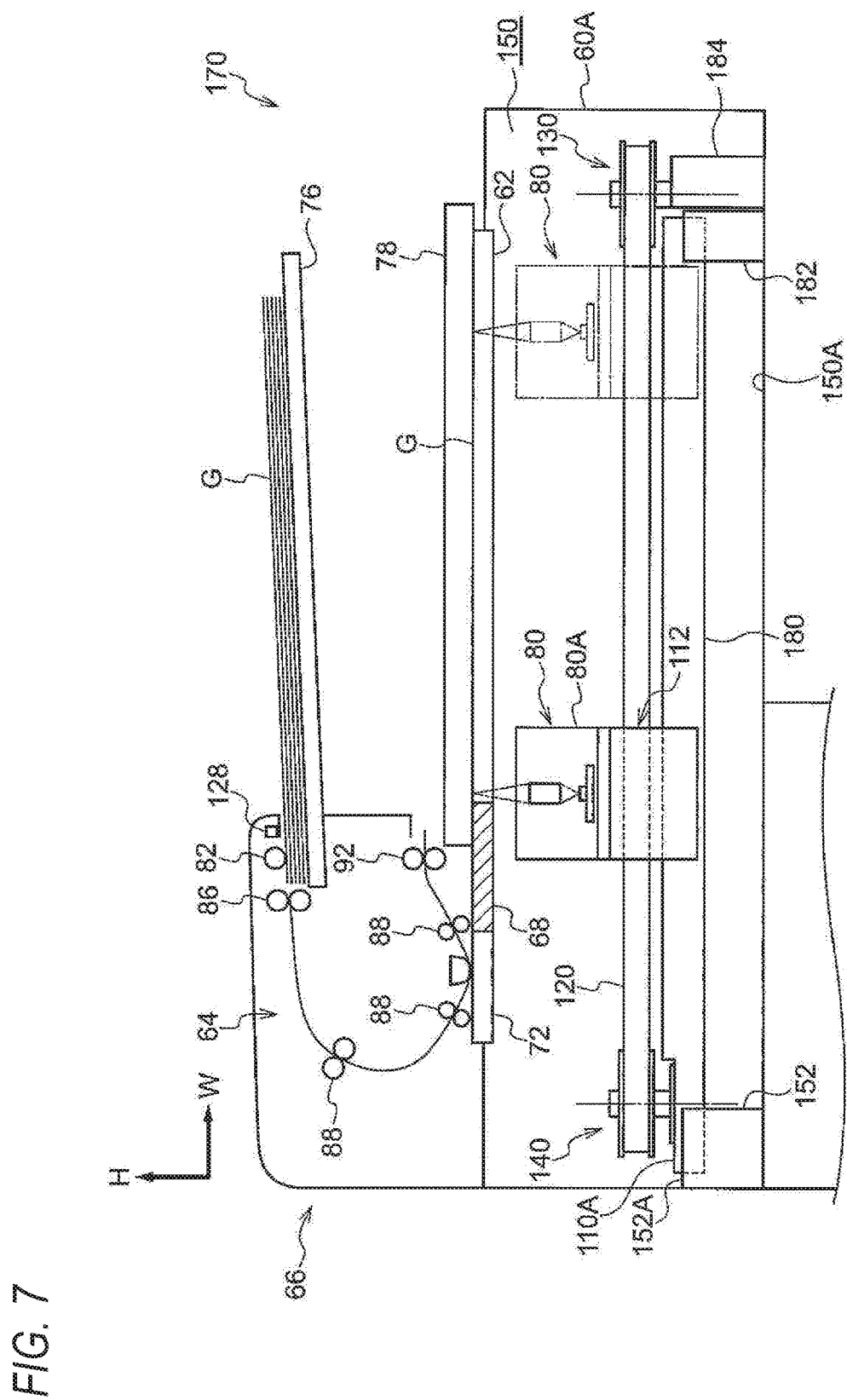
FIG. 7 is a diagram illustrating a configuration of an image reader according to a second exemplary embodiment.

Next, an example of an image reading unit according to a second exemplary embodiment will be described with reference to FIG. 7. Meanwhile, the same members as those in the first exemplary embodiment are denoted by the same reference numerals and signs, and thus the description thereof will not be given. Portions different from those in the first exemplary embodiment will be chiefly described below.

A shaft 180 included in an image reading unit 170 according to the second exemplary embodiment does not have the flat portion 110A facing upward formed on one end side (right side in the figure) thereof, and is smaller in length than the shaft of the first exemplary embodiment. A support portion 182 that supports the one end side of the shaft 180 protrudes upward from a bottom plate 150A forming the space 150, and is formed integrally with the housing 60A.

In addition, a pedestal 184 to which the driving pulley 130 is attached protrudes upward from the bottom plate 150A on one side (right side in the figure) of the support portion 182 in the width direction of the apparatus, and is formed integrally with the housing 60A.

In this manner, the driving pulley 130 is attached to the pedestal 184 formed integrally with the housing 60A made of resin, and the driven pulley 140 is attached to the metallic shaft 180. Therefore, it is possible to suppress a change in the gap between the driving pulley 130 and the driven pulley 140 which is caused due to a change in the ambient temperature around the apparatus, as compared with a case where both the driving pulley 130 and the driven pulley 140 are attached to the housing 10A made of resin.

Other operations are the same as those in the first exemplary embodiment.

Meanwhile, although specific exemplary embodiments have been described in detail, the present invention is not limited to such exemplary embodiments, and it will be apparent to those skilled in the art that other various exemplary embodiments may be implemented without departing from the scope of the present invention. For example, in the second exemplary embodiment, the driving pulley 130 is attached to the pedestal 184 formed integrally with the housing 60A made of resin, and the driven pulley 140 is attached to the metallic shaft 180. However, the driven pulley may be attached to the pedestal formed integrally with the housing made of resin, and the driving pulley may be attached to the metallic shaft.

In addition, in the first and second exemplary embodiments, although not particularly described, an inclination preventing member that prevents the reading unit from inclining when viewed in the width direction of the apparatus may be provided.

In addition, in the first and second exemplary embodiments, although not particularly described, the endless belt 120 may be a timing belt, and the driving pulley 130 and the driven pulley 140 may be timing pulleys.

In addition, in the first and second exemplary embodiments, the shaft 110 is made of a metal, but may be made of a resin or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reader comprising:
   a transparent plate configured to support an original document on which an image is recorded;
   a scanner that is disposed inside a housing, wherein the scanner is configured to read an image of the original document supported by the transparent plate while the scanner moves in a movement direction;
   a guide shaft that extends in the movement direction and is configured to guide the scanner to move in the movement direction; and
   an endless belt that is wound around a driving pulley configured to perform rotational driving and a driven pulley configured to be driven to rotate,
   wherein the endless belt is configured to rotate around the driving pulley and the driven pulley to move the scanner guided by the guide shaft,
   wherein at least one of the driving pulley and the driven pulley is attached to the guide shaft, and wherein the at least one of the driving pulley and the driven pulley is attached to the guide shaft so that a rotational axis of the at least one of the driving pulley and the driven pulley extends in an up-and-down direction.

2. The image reader according to claim 1, wherein the guide shaft is made of a metal.

3. The image reader according to claim 2, wherein both the driving pulley and the driven pulley are attached to the guide shaft.

4. An image forming apparatus comprising:
the image reader according to claim 3; and
an image forming unit configured to form an image on a recording medium using image data read by the image reader.

5. An image forming apparatus comprising:
the image reader according to claim 2; and
an image forming unit configured to form an image on a recording medium using image data read by the image reader.

6. The image reader according to claim 1, wherein both the driving pulley and the driven pulley are attached to the guide shaft.

7. An image forming apparatus comprising:
the image reader according to claim 6; and
an image forming unit configured to form an image on a recording medium using image data read by the image reader.

8. An image forming apparatus comprising:
the image reader according to claim 1; and
an image forming unit configured to form an image on a recording medium using image data read by the image reader.

9. The image reader according to claim 1, wherein the scanner is disposed above the guide shaft in the up-and-down direction.

10. The image reader according to claim 1, wherein the guide shaft comprises:
a first flat portion located at a first end of the guide shaft in the movement direction; and
a second flat portion disposed at a second end of the guide shaft in the movement direction, the second end being opposite to the first end, and
wherein the at least one of the driving pulley and the driven pulley is attached to the guide shaft at either the first flat portion or the second flat portion.

\* \* \* \* \*